United States Patent [19]

Lövgren

[11] 4,037,301

[45] July 26, 1977

[54] METHOD OF MANUFACTURING DOORS AND ARRANGEMENT THEREFOR

[75] Inventor: Anders Lövgren, Skelleftea, Sweden

[73] Assignee: UTEC AB, Skelleftea, Sweden

[21] Appl. No.: 586,692

[22] Filed: June 13, 1975

[30] Foreign Application Priority Data

June 14, 1974 Sweden ................................ 7407872

[51] Int. Cl.2 ................................................ B23P 21/00

[52] U.S. Cl. ........................................ 29/429; 29/448; 29/564.8; 29/782

[58] Field of Search ...................... 29/431, 429, 200 R, 29/200 A, 200 J, 448; 160/84 R, 130; 156/65, 269

[56] References Cited

U.S. PATENT DOCUMENTS

| | | | |
|---|---|---|---|
| 2,714,413 | 8/1955 | Hunter et al. | 156/65 |
| 3,226,803 | 1/1966 | Samuels | 29/429 |
| 3,546,771 | 12/1970 | Fahrenbach | 29/429 |
| 3,699,628 | 10/1972 | Gollobitz | 29/200 A |

FOREIGN PATENT DOCUMENTS

| | | | |
|---|---|---|---|
| 1,192,956 | 4/1959 | France | 156/269 |
| 207,564 | 4/1960 | Sweden | |

*Primary Examiner*—C.W. Lanham
*Assistant Examiner*—Daniel C. Crane
*Attorney, Agent, or Firm*—Pollock, Vande Sande & Priddy

[57] ABSTRACT

A method for fabricating doors having spaced sheets of flexible material with cross-memebers interposed and attached between the material. Flexible material is fed intermittently from material supplies to form both sides of the door. Between each feed step the material is connected to a cross-member in a predetermined operative position, in which the cross-member abuts a movable carrier. The positioning of the cross-member in the operative position is effected by the carrier which causes vertical material feed. The feeding of flexible material and connection of each cross-member is continued until the desired door size is accomplished.

4 Claims, 14 Drawing Figures

METHOD OF MANUFACTURING DOORS AND ARRANGEMENT THEREFOR

BACKGROUND OF THE INVENTION

This invention relates generally to doors and particularly to doors of industrial buildings of the type which comprise a door leaf which is guided relative to the vertical sides of the door frame and comprises preferably two laterally spaced sheets of flexible material, for example cloth, with cross-members of spaced relationship arranged therebetween and connected to the lateral sheets. The doors are opened by being hoisted by means of at least one, and preferably two, or possibly more, ropes, wires or the like.

This door type is of an entirely new kind and has many essential advantages over known industrial doors. One very important advantage of this door is that it can be designed, due to its low weight, with a very large surface. Also its design is such that, when opened, it exposes the space inside the building, substantively entirely, irrespective of how large that space may be. This space, thus, can be utilized at a maximum, especially with respect to its width, but also with respect to its height. This is of great importance in many industrial buildings, such as assembly shops, garages, hangars, workshops, storehouses of different kind, drying plants for wood, and so on.

SUMMARY OF THE INVENTION

The present invention more precisely relates to a method of manufacturing such doors and to means for carrying out the method. It is the object of the invention to provide a method which is simple and convenient and renders possible a high production rate with a minimum of labor, and which can be utilized not only in a factory but also in the field for manufacturing primarily large doors which may be difficult to transport from the factory to the place of application. The invention further has the object of providing means for carrying out the method which is per se cheap and simple to handle and can substantially be operated by one man.

BRIEF DESCRIPTION OF THE DRAWINGS

The invention is described in greater detail in the following, with reference to the accompanying drawings, in which.

DETAILED DESCRIPTION OF THE PREFERRED EMBODIMENT

Figure 1:
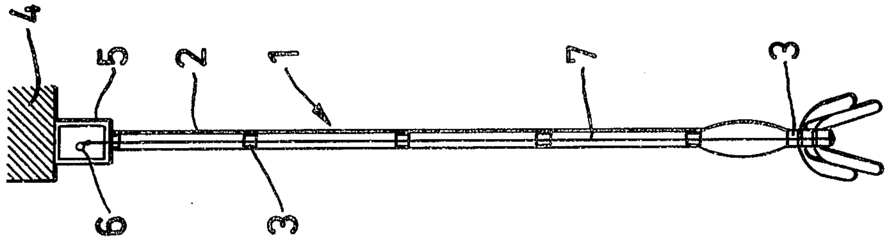
FIG. 1 is a section through a door of the invention shown in a partially hoisted position.

In FIG. 1 a door is shown which comprises a leaf 1, which is guided relative to the vertical sides of the door frame and comprises preferably two lateral pieces 2 of a soft, flexible material, for example cloth of reinforced plastic, and a plurality of cross-members 3 between said lateral pieces and connected thereto, which members are positioned in spaced relationship and shown in the form of rectangular sections. The door leaf 1 is, at its upper portion, fastened to a section 5, which is suspended from the upper portion 4 of the door frame and includes a mechanism, for example in the form of a hoisting means for opening and closing the door by means of at least one rope 7, wire, chain, or the like, which hoisting means is only schematically indicated at 6 in FIG. 1.

The rope is fastened to the lowermost cross-members 3. One or several of these cross-members 3, and preferably all of them, are provided at both their ends with guide members which may be in the form of rollers (see 8 in FIG. 5), and which are adapted to co-operate with guide bars provided on both vertical sides of the door frame to prevent the door leaf from moving in a lateral direction and at the same time to absorb the wind forces to which the door possibly may be subjected.

In the manufacture of such doors, according to the present invention a method is proposed which, in general, provides that the flexible material for one, or both, sides of the door leaf is fed intermittently or in steps as one or, respectively, two coherent material webs from one or more supplies of such material. Between each feed step, the material is connected to a cross-member in a predetermined operative position, in which said cross-member abuts a movable, preferably liftable and lowerable, carrier. The positioning of the cross-member in the operative position is effected by the carrier, which in certain embodiments, also entirely or partially effects the material feed. This feed should, according to the invention, take place in vertical direction, particularly when two material webs to be fed simultaneously, because then the stretching of the material can better be guided and controlled than if the material feed takes place in another direction, for example, the horizontal direction. In the latter cases, the deflection of this web and other factors of varying influence on the webs must be taken into account. This does not mean, however, that the invention embraces only the use of a vertical feed direction because other feed directions also fall within the scope of the inventive concept.

Further details on the method of the invention will become apparent from the following description of several embodiments of the apparatus of the invention which are shown as being applied to the manufacture of doors of the kind described above, i.e., doors, both of whose sides are entirely covered with flexible material, for example cloth of reinforced plastic.

Figure 2:
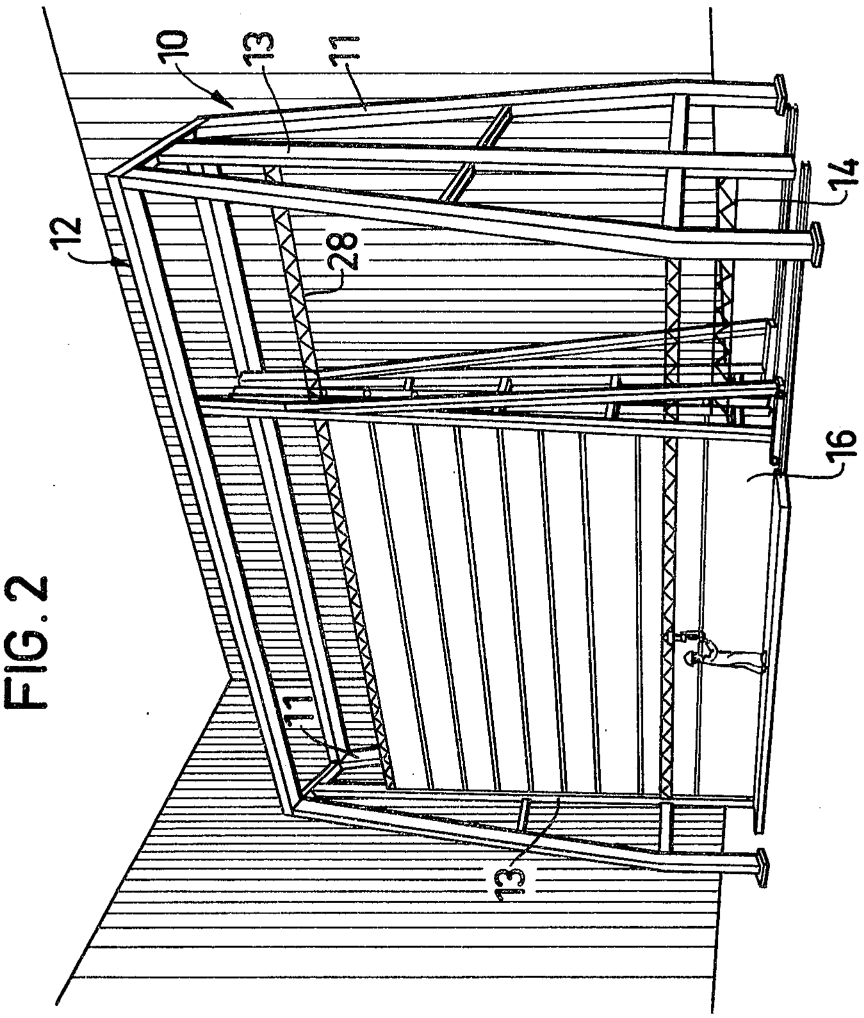
FIG. 2 is a perspective view of a first embodiment of apparatus for constructing a door according to the invention.

The apparatus of the invention, as is especially apparent from FIG. 2, comprises, in all embodiments shown, a stand generally designated by 10 and comprising four legs 11 and a frame 12 interconnecting said legs. Between each pair of legs on the short sides of the stand, a guide 13 is provided for a carrier 14 which extends along the longitudinal direction of the stand and is liftable as well as lowerable. Said carrier is shown in the form of a lattice girder and is primarily intended for positioning and carrying one cross-member 3 at a time to its predetermined operative position in which the cross-member is intended to be connected to the material comprising the sides 2 of the door leaf. In the embodiments shown, the plastic cloth is fed from below from a supply 15 (FIG. 4) as coherent material webs 16 on both sides of the carrier 14, which webs run over rollers included in a stretching mechanism 17 so that both webs are equally stretched. The material, as mentioned, may be a flexible cloth of reinforced plastic.

The carrier, which should be of a smaller width than the cross-members of the door, is shown in the drawings as carrying a cross-member 3 provided with guide rollers 8 in operative position. The cross-member is connected to the material which is suspended on both sides of the carrier from the door portion 18 already fabricated and suspended in the stand, and constituting a continuation of the material webs 16 fed from the supply 15. The apparatus comprises an automatic tool 19 on each side of a vertical plane through the guides 13. These tools 19 are each suspended by means of a travelling carriage 20 from a beam 21 extending between the short sides of the stand and located outside of the respective material web 16, so that the material can be pressed against the cross-member 3 carried by the carrier 14. The connection preferably is made by means of screws or the like which the tools 19 are effective to drive through the cloth and into the cross-member 3 lying upon the carrier 14. Bars 9 details may preferably also be inserted in order to bring about a distribution of forces occurring during the installation of the door.

Figure 4:
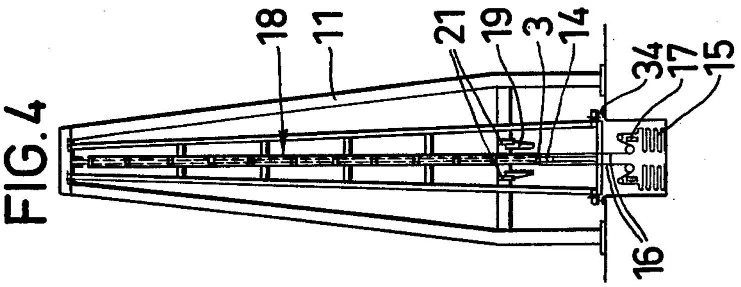
FIGS. 3 and 4 are a side view and, respectively, an end view of the apparatus of FIG. 2.
Figure 5:
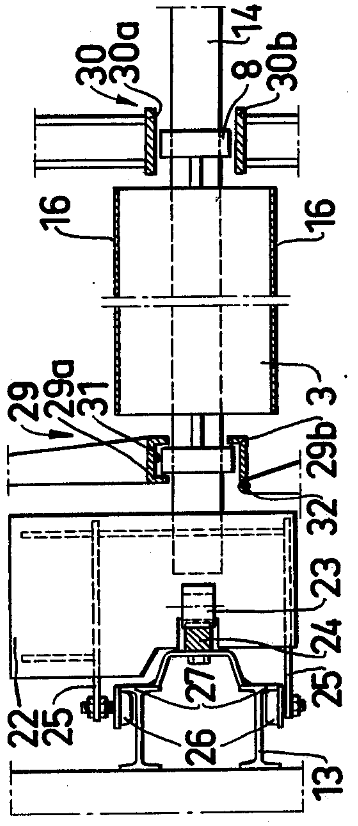
FIG. 5 is an enlarged section along the line V—V in FIG. 3 shown in a schematic way.

To position a cross-member 3 in operative position, the carrier is movable along the guides 13. This motion is effected by means of a drive motor 22 provided at each end of the carrier. As is apparent from FIG. 5, the output shaft of the drive motor supports a gearwheel 23 co-operating with a rack 24 secured to the guide 13. The carrier 14, furthermore, is guided at each end in relation to the guides 13 by adjustable guide wheels 26 supported on arms 25. The wheels 26 each have inwardly facing portions which run against flanges 27 on each of the guides 13, whereby the gearwheels of the drive motors are held in engagement with the racks 24, and the carrier 14 is prevented from moving through a larger distance in its longitudinal direction relative to the guides. As shown in FIG. 5, the guide wheels 26 in co-operation with the flanges 27 also prevent the carrier 14 from moving appreciably in the lateral direction relative to the guides 13. Above the carrier 14 and in the same plane therewith, in the embodiments according to FIGS. 2 to 7, a feed means 28 is provided for drawing material 16 intermittently or in steps from the supply 15 and for simultaneously removing the mounted cross-member 3 lying on the carrier 14. Said feed means, the embodiments shown, has the same form and is provided in the same manner as the carrier 14 with a drive motor 22 at each end, which motors effect the motion of the feed means along the guides. At this location of this feed means, there is suspended the portion 18 of the door which is already fabricated and also the material webs 16. By moving the feed means 28 a step corresponding to the distance between two cross-members in the direction away from the carrier 14, new material 16 is fed from the supply 15 at the same time that the cross-member last mounted is moved one step away from the operative position, which thereby becomes vacant, so that the carrier can place a new cross-member in this position.

In the embodiment shown in FIGS. 2 to 5, the uppermost cross-member of the door leaf, or the cross-member mounted first, is intended to be fastened directly onto the feed means 28, more precisely to its lower surface by means of known fastening members (not shown), preferably some kind of quick-coupling members, so that the fastening of said cross-member on the feed means (which may be in the form of a beam 28) can take place readily and simply by moving the carrier with the cross-member lying thereon against the feed beam 28. The feed beam 28 may be moved one step higher, with new material from the supply 15 being fed simultaneously therewith, or lowered so that the feed beam 28 lies against the cross-member 3 lying in operative position on the carrier 14, whereafter the feed beam is raised one step for the feed of new material. A new cross-member can now be placed into operative position and be connected to the material 16 suspended on both sides from the previously mounted cross-member. Thereafter the feed beam is raised one step for each cross-member added until the door leaf is completed or no additional step can be executed.

Figure 3:
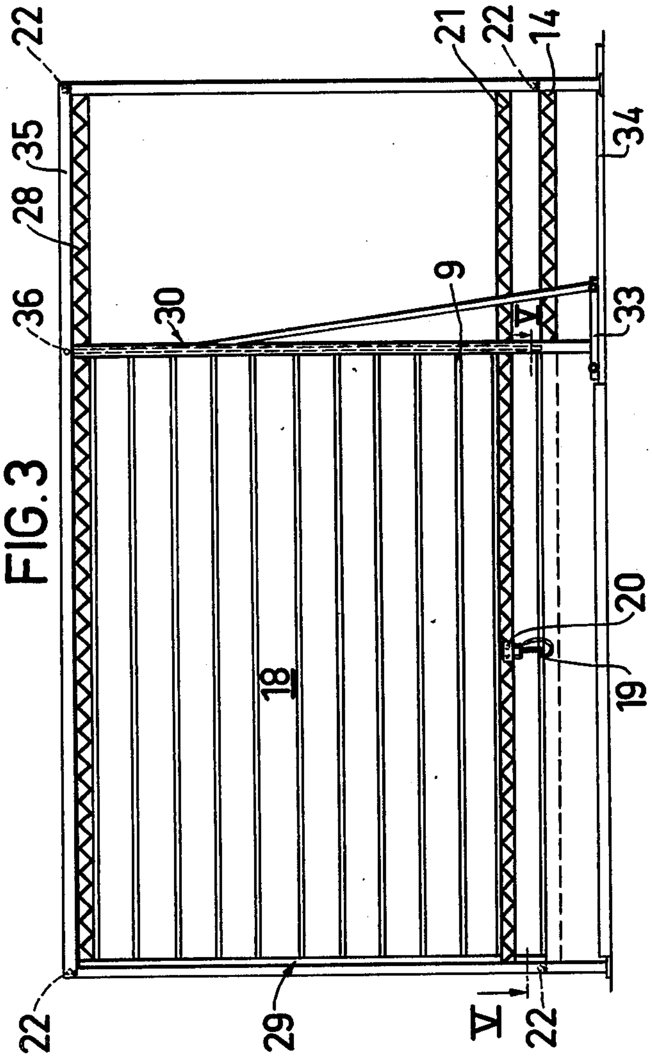
Figure 6:
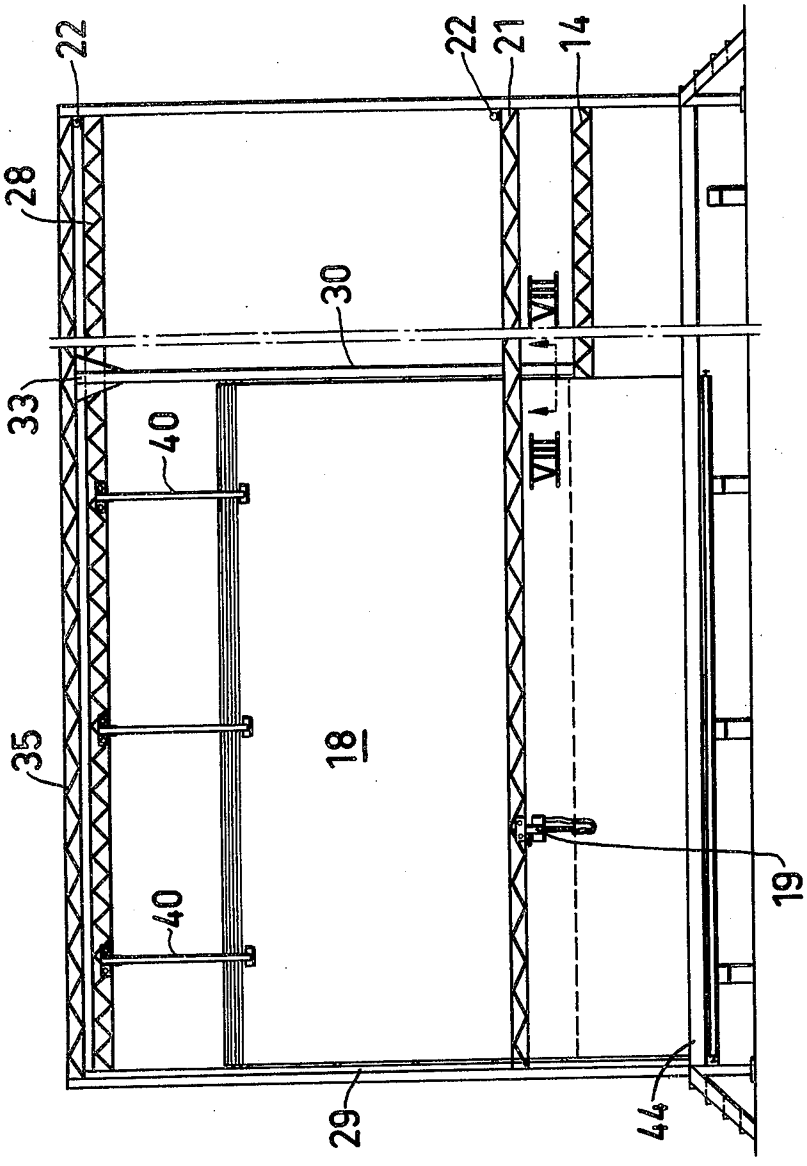
Figure 9:
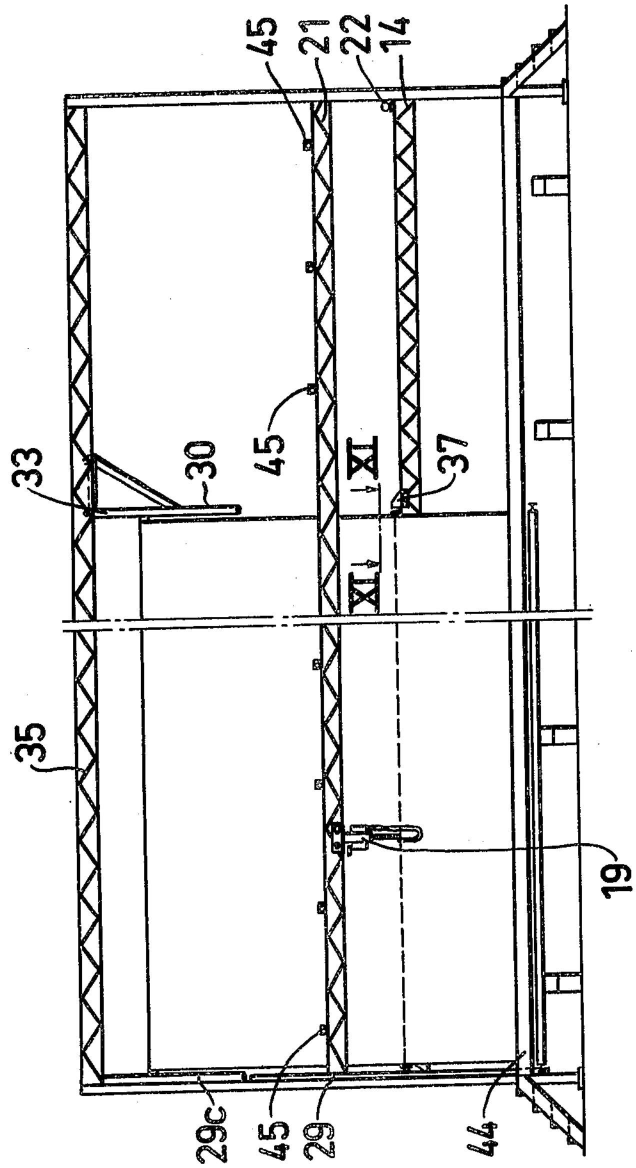

In order to prevent the cross-members 3 from moving laterally or in longitudinal direction and thereby cause feed of material and bring about an unintentional change in the stretch of the material webs 16 and give rise to skewness of the completed door, each embodiment of the arrangement comprises guides 29 and 30 for the cross-members and, more precisely, for their guide rollers 8. The guide 29 is positioned at one short side of the stand and includes a stationary guide bar 29*a* (FIG. 5) with U-shaped guide groove 31 and an L-shaped guide bar 29*b* pivotally supported about an axle 32. The vertical height of guide bar 29*b* must be sufficient that the bar when pivoted around from the position shown, will permit each completed door to be removed in folded state, from the apparatus i.e. with the cross-members abutting each other. The remaining part of the guide 29 comprises a stationary guide bar 29*c*, see FIG. 9. The second guide 30, which also comprises two guide bars 30*a* and 30*b* facing each other with or without U-shaped guide groove, is supported on a carriage 33, which is movable in the longitudinal direction of the stand, as shown in FIGS. 3–5, on rails 34 and guided at the upper portion of the longitudinal frame beams 35 of the stand by means of wheels 36, and which at other embodiments is suspended fro the upper frame beams 35 of the stand, as shown in FIGS. 6 and 9. Due to the movability of one of the guides, the arrangement is not limited to one door width but is adjustable to the manufacture of doors having different widths.

In operative position, these guides 29, 30 act also as a fixture for the cross-member supported on the carrier 14, thereby retaining the cross-member in position during the driving-in of the screws which secure the material 16. In an embodiment such as that shown in, for example, FIG. 9, where the guide 30 does not extend all the way to the operative position, the carrier 14 may be provided with a carriage 37, which is movable along said carrier and in which one guide wheel 8 of the cross-member is placed between surfaces 38 and 39, (FIG. 11) which can then function effectively as a continuation of the guide bars 30*a* and 30*b* suspended thereabove.

Figure 7:
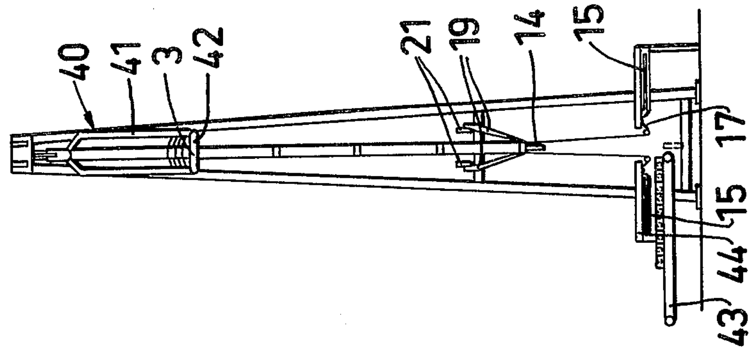
FIGS. 6 and 7 are a side view and, respectively, an end view of a second embodiment of apparatus for constructing a door according to the invention.
Figure 8:
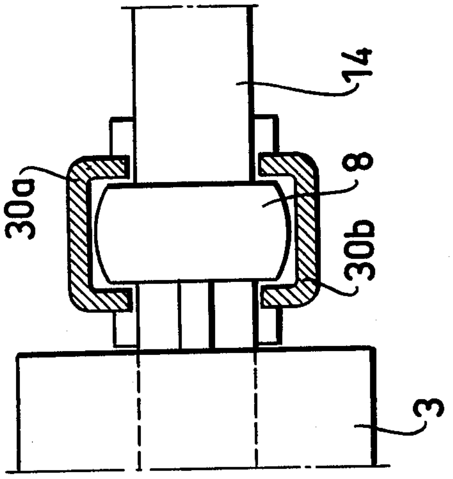
FIG. 8 is an enlarged section along the line VIII—VIII in FIG. 6 shown in a schematic way.

In the embodiment shown in FIGS. 3 to 5 the stand must be made relatively high, because its height directly determines the possible height of the doors to be manufactured therein. To make it possible to reduce the stand height and therewith the space required, and at the same time to render it possible to manufacture doors of a greater height than the stand, the feed beam 28 in the embodiment according to FIGS. 6 to 8 is provided with several suspended grab means 40, which are operable hydraulically, pneumatically or electrically and movable along the feed beam and provided with relatively long grab arms 41 equipped with grab members 42, which arms between themselves form a space for cross-members 3 lying and mounted upon each other, as shown in FIG. 7.

Figure 11:
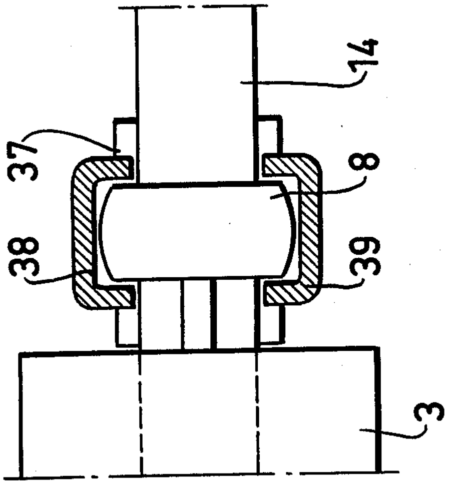
FIG. 11 is an enlarged section along the line XI—XI in FIG. 9 shown in a schematic way.
Figure 10:
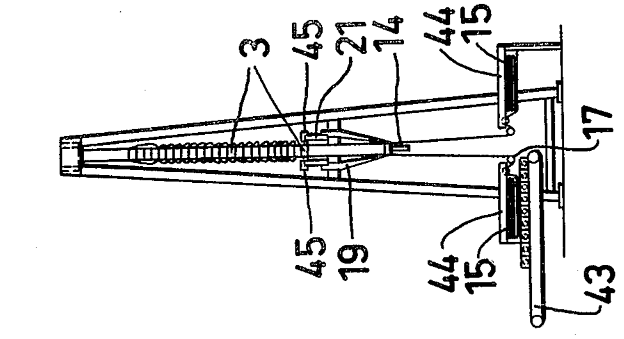
FIGS. 9 and 10 are a side view and, respectively, an end view of a third embodiment of apparatus for constructing a door according to the invention.

When the first cross-member for a door has been fastened between the sheets 16 of this plastic material, the feed beam 28 with the grab means is lowered to a position, in which the grab arms 41 with their grab members 42 can engage the cross-member lying on the carrying beam 14 in operative position, whereafter the feed beam is raised one step and simultaneously the carrying beam 14 can be lowered to the bottom position shown by dashed lines in FIG. 6 in order to support a new cross-member, which in this embodiment, as in the embodiment according to FIGS. 9–11, is fed onto the carrying beam from a conveyor 43 provided with a supply of cross-members, and to place this member in operative position. When the plastic sheets have been fastened to this cross-member, the feed beam 28 is raised one step for feeding new material from the supplies 15 located beneath walkways 44 and removing the last-mounted cross-member.

This is repeated until the feed beam cannot be raised any more steps. In this position the feed beam 28 is lowered sufficiently to permit the cross-members retained by the grab means 40 to abut the mounted cross-member lying on the carrier beam 14. The cross-member on carrier 14 then supports cross-members lying above so that the grab means 40 can be released and and then grab with their grab members 42 the cross-member lying on the carrier beam 14. Thereafter, the feed beam 28 can again be raised one step for each mounted cross-member until the uppermost position again has been reached, and so on, until the space formed by the grab arms is entirely filled, and the feed beam 28 cannot be raised any more steps. The door leaf thus obtained is then taken out after the material webs have been cut off at the lowermost cross-member. To prevent the material webs thus cut off from being pulled down, the carrier beam 14 can be provided with means (not shown in the drawings) for clamping the material webs 16 against the carrier beam 14 prior to the cutting-off and thereby facilitating also the fastening of these webs to the first cross-member of the next door.

In this embodiment, the beams 21 supporting the automatic tools 19 can also be raised and lowered in the same manner as the carrier and feed beams 14 and 28, but along guides of their own (not shown in the Figures), in order to render it possible for the grab means 40 to engage a cross-member lying on the carrier beam 14 in operative position in such cases when the carrier beam, due to the design of the guide 30, cannot be raised above the operative position. The raising and lowering capacity of these beams 21 is determined in FIG. 6 by the drive motor 22.

In FIGS. 9 to 11, an embodiment of the arrangement is shown, in which the stand can be made still lower than with the foregoing embodiment without reducing the maximum obtainable door height. This is accomplished by pushing upwardly each mounted cross-member from below by means of the carrier beam 14, which in this case also effects the feed of new material and the last-mounted cross-member in steps. The feed beam used in previously described embodiments, thus, is entirely omitted and, instead, the beams 21 supporting the automatic tools are provided with grab members 45 co-operating in pairs which are located one step above the operative position and arranged to clamp between themselves and hold the last cross-member fed by the carrier beam, with the other mounted cross-members stacked thereon, as shown in FIG. 10. To control the step length, the beams 21 may be arranged to be raised and lowered, but this control can also be realized by raising or lowering the operating position.

The feed in this embodiment is, as already mentioned, effected entirely by the carrier beam 14. When the material webs 16 have been fastened to the cross-member lying on the carrier beam 14 in operative position, the carrier beam 14 is moved upward until the cross-member lying thereon abuts the cross-member retained by the grab members 45. Thereafter, the grab members are released, and the carrier beam 14, which in this phase carries all cross-members guided by the guides 29 and 30, is caused to complete its step so that the grab members 45 can catch the cross-member 3 lying on the carrier beam and support the entire stack of mounted cross-members.

Figure 13:
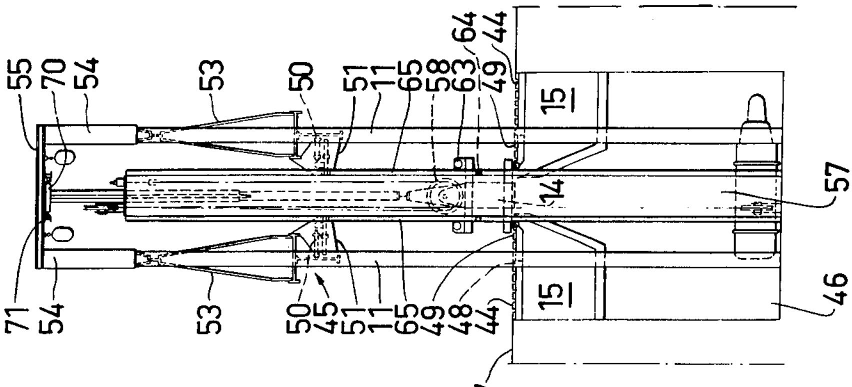
FIGS. 12 and 13 are a side view and, respectively, an end view of a fourth embodiment of apparatus for constructing a door according to the invention.
Figure 12:
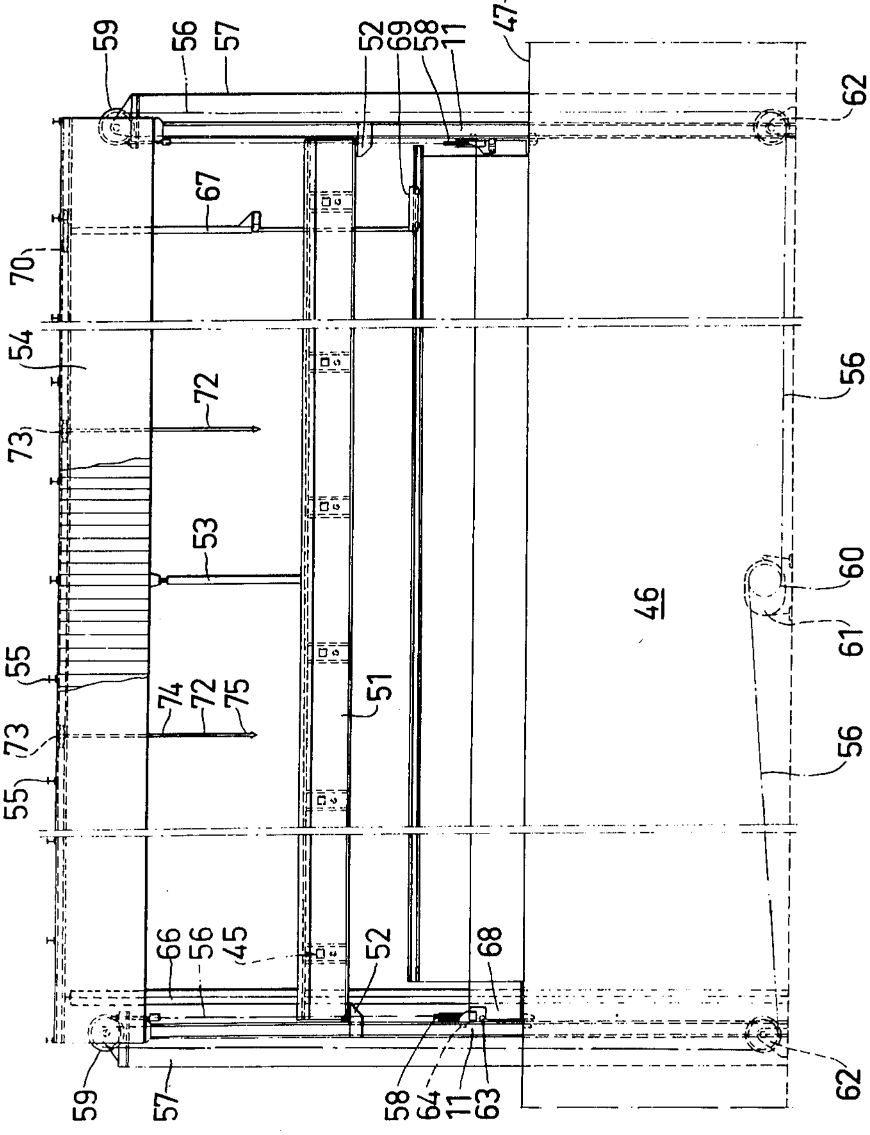

In FIGS. 12 and 13 a further embodiment of the apparatus according to the invention is shown which is partially lowered into a cavity 46 beneath the floor or ground plane 47. Within said cavity, the cloth supplies 15 are arranged on both sides of the carrier or hoist beam 14 and beneath the walkways 44. The walkways are shown lying in the same plane and are formed of covers 49 when longitudinal portions face toward each other and can be opened section-wise, being provided along their entire length with hinges 48 to render possible access to the supplies 15. The carrier beam 14 can also be raised and lowered to feed by steps new cloth material from the supplies 15 and to place the cross-member, which in operative position is assembled with the cloth material, between the grab members 45 located one step above the operative position and arranged to clamp between themselves and to hold the cross-member fed last by the carrier beam. These grab members are shown in this embodiment as clamping cylinders 50, which are arranged in pairs directly in front of each other in beams 51, which are fastened to the legs 11 of the stand by means of brackets 52 and for preventing deflection are suspended by means of suspension irons 53 from lattice jaws 54, which are interconnected by crossbeams 55.

To raise and lower the carrier beam 14, it is suspended at its ends horizontally on ropes 56, each of which is fastened with its upper end to the upper portion of a tower 57 of lattice structure provided between the legs 11 at the short sides of the stand. Each rope 56 is laid about a pulley 58 at the end of the beam and about a pulley 59 above the tower 57 and thereafter through the tower to a drum 60 on a drive motor 61 via a pulley at the foot of the tower or on the bottom of the cavity. The two ropes 56 are so wound on the drum 60 of the drive motor that they are wound on and off simultaneously, so that the carrier beam 14 always is held horizontal during its movement. In order to prevent the carrier beam 14 to move to some greater extent in its longitudinal or transverse direction, the beam is provided at its ends with guide wheels 63, 64, which cooperate with guides 65 on the tower 57.

In this embodiment, all cross-members 3 (see FIG. 1) required for the door to be mounted are intended in the starting position to be stacked one upon the other on the carrier beam 14 and are held thus stacked by guides 66 and 67 with guide grooves for the rollers 8 (see for example FIGS. 5, 8 and 11) provided at the ends of each cross-member. The guide 66 is stationary and extends between the projecting end portions 68 of the carrier beam 14 which support the guide wheels 63 and 64, and it can, like the guide 29 shown in FIG. 5, comprise a guide bar *29b,* which is pivotal about an axle. The second guide 67 is telescopic and its position is laterally adjustable to the length of the cross-members movable along the carrier beam 14 by means of a carriage 69 running on the carrier beam and comprising at its upper end a carriage 70 adapted to run on a runway 71 fastened on the transverse beams 55.

In its starting position, the carrier beam 14 is set so that the uppermost cross-member in the stack is in the operative position, which is determined by switches (not shown in FIGS. 12 and 13) and located beneath the clamping cylinders 50 at a distance corresponding to the distance between two cross-members of the completed port. When the two material webs have been fastened each to one side of the cross-member placed in operative position, the carrier beam 14 is raised until the uppermost cross-member is disposed in the middle between the clamping cylinders 50, which thereby are caused to clamp this cross-member. Thereafter, the carrier beam 14 again is lowered one step, and the uppermost cross-member on the carrier beam assumes said operative position. Thereafter, the material webs are fastened to the cross-member lying on the carrier beam 14 in operative position, and the carrier beam 14 then is raised about one step so that the cross-member mounted last abuts the cross-member retained by the clamping cylinders 50. After the release of this cross-member, which then is supported on the uppermost cross-member on the carrying beam, the carrier beam is moved further in the upward direction until catching members 72 disposed above the clamping cylinders at a distance corresponding to one step, i.e. the distance between two cross-members of the completed door, have caught the upper cross-member. The carrier beam 14 is thereafter again lowered one step so that the cross-member mounted last can be clamped between the clamping cylinders 50 whereafter the carrier beam is lowered one more step to place a new cross-member in operative position. This is repeated until the entire door is completely fabricated.

Figure 14:
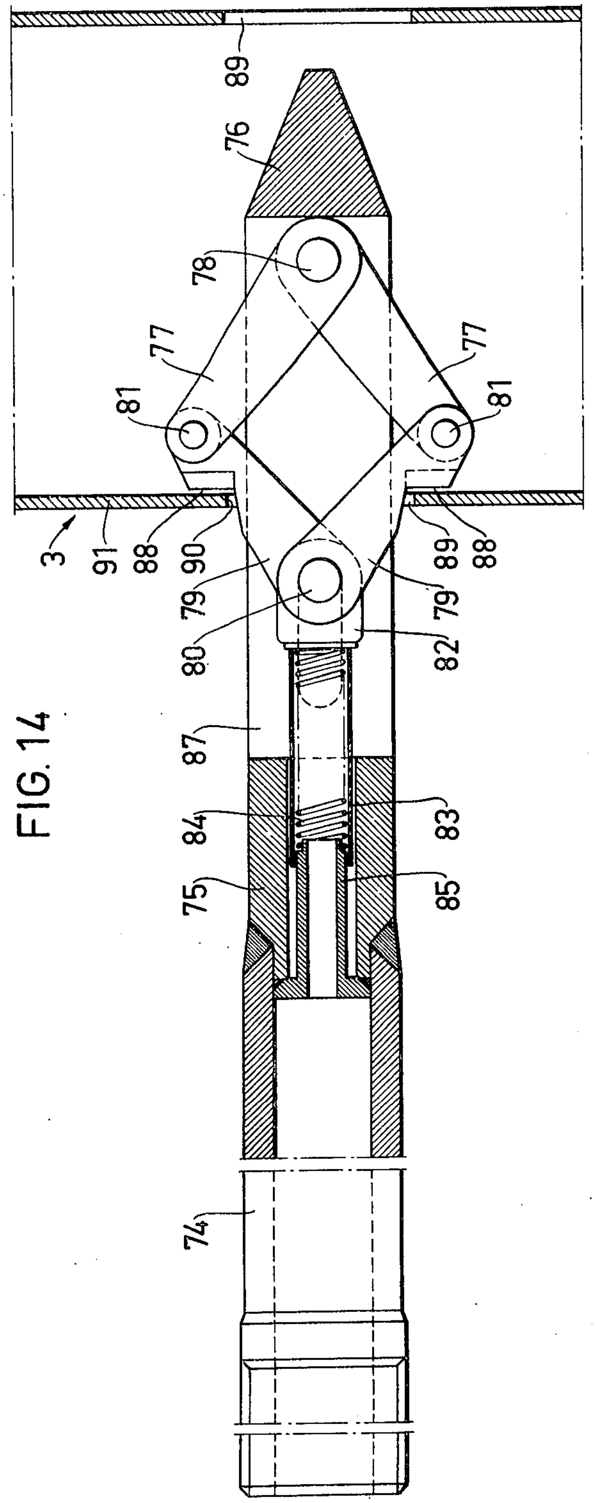
FIG. 14 is a longitudinal section through a detail in said last-mentioned embodiment.

The catching members 72 are each suspended from a carriage 73, which is movable along the runway 71, and are so set that each is disposed directly above one of the holes provided in the cross-members for the ropes 7 (see FIG. 1), by means of which the door is opened and closed. Each catching member comprises a pipe 74 (FIG. 14) stationary with the carriage, and attached to said pipe a guide pin 75 terminating in a point 76. Within a slot-shaped aperture 87 in said guide pin 75, a linkage is provided which comprises two lower link members 77 mounted about a pin 78 supported on said guide pin 75, and two upper link members 79 formed with carrying surfaces 88 and mounted about a movable pin 80 and by pins 81 connected to the two other link members 77. The pin 80 is fastened to a fork-shaped holder 82, between the legs of which the link members 79 are mounted on the pin 80. The holder 82 is connected to a sleeve 83, within which a compression spring 84 is provided between the holder 82 and a hollow spring guide 85, which is fastened to the end of the guide pin 75. The pin 80 is guided with its ends in grooves 86 provided within the guide pin 75 and limiting the motion of the pin 80 in the longitudinal direction of the catching member. In FIG. 14, the pin 80 is shown in its lowermost position, in which the link members with the carrying surfaces 88 are located outside the periphery of the guide pin. When now a catching member is inserted into a hole 89 in a cross-member 3 so that the cross-member by the carrying beam 14 is moved in the upward direction, the link members 77 and 79 are pressed by the hole edge 90 into the aperture 87 in the guide pin 75 against the action of the compression spring 84. The cross-member, designed as a square section, thus, can pass the link members with its upper wall 91. When the hole edge 90 does not any longer act upon the link members 77 and 79, these members are automatically pressed outwardly by the compression spring 84 to the position shown in FIG. 14, and thereby the carrying surfaces 88 are moved inwardly beneath the wall 91 about the hole 89 and, thus, by abutment to said wall are capable to support and retain the cross-member 3 also with one or more mounted cross-members stacked thereon. To remove the cross-members supported on the catching members 72, the holder 82 in each catching member 72 can be connected to an operating rope (not shown in the drawings), which may extend upward through the catching member 72 and, for example, about a pulley at the upper portion of the catching member, and which has a portion suspended from said pulley. When pulling on the suspended portion of the operation rope, thus, the link members 77 and 79 and therewith the carrying surfaces 88 are drawn into the aperture 87 of the guide pin, thereby releasing the cross-member 3, which thus can be removed from the catching member together with the cross-members stacked upon said cross-member. This operation of the link members of the catching member may also be effected by means of a piston-cylinder device.

The present invention is not restricted to the embodiments described above and shown in the drawings, but may be modified, altered and combined in many different ways within the scope of the invention conception as it is set forth in the claims.

What I claim is:

1. A method for the manufacture of a door of the kind comprising two parallel spaced webs of flexible material connected to laterally spaced cross-members and comprising the steps of:

a. feeding in parallel fashion from each of two supply sources a continuous web of a flexible material which said webs are maintained under tension while supported on a frame, the feeding of said webs occurring a step at a time and by an amount substantially equalling a preselected spacing between supporting cross-members, b. inserting in the space between said two webs at intervals corresponding to the preselected spacing an elongate cross-member extending in the direction transverse to the direction of feed of the webs, c. securing the two webs on respectively opposite sides of each cross-member, d. repeating steps (a) through (c) until the preselected door dimension is obtained, e. severing the attached webs from their respective frames, f. telescoping the door section by bringing into substantially abutting relationship the cross-members which have been attached to said webs, g. removing the door section from the frame.

2. The method of claim 1 wherein the free ends of the webs are intermittently pulled to feed the respective webs from their supply and to move the cross-members which have been secured to the opposed webs, each successive cross-member before securing to the webs being moved to a predetermined position in the direction of web movement.

3. The method of claim 1 wherein at times a portion of the door section comprising of plurality of cross-members secured to opposed web members is collapsed in accordian style by bringing the secured cross-members into abutting relationship while still supported on the frame, and thereafter moving the thus collapsed door section as a unit in the direction of judging of said webs to draw further lengths of said webs from their respective sources and thus permit the continued fabrication of the door section.

4. The method of claim 1 wherein a plurality of said cross-members is supported in stacked relationship between the webs while the webs are supported vertically on the frame which is vertical and with the webs being transported upwardly, securing to the webs the topmost cross-member in the stack and thereafter moving upwardly the web with the attached cross-members so as to permit the cross-member now on top of the stack to be secured to the spaced webs.

* * * * *